United States Patent
Pediatidakis et al.

(10) Patent No.: US 12,495,092 B1
(45) Date of Patent: Dec. 9, 2025

(54) HARDWARE AND SOFTWARE COMMUNICATION PROTOCOL

(71) Applicant: Tractian Technologies Inc, Atlanta, GA (US)

(72) Inventors: Kimon Pediatidakis, São Paulo (BR); William Löschner, São Paulo (BR); Pedro Calori Badini, São Paulo (BR); Thiago Mochetti, São Paulo (BR)

(73) Assignee: Tractian Technologies Inc, Atlanta, GA (US)

( * ) Notice: Subject to any disclaimer, the term of this patent is extended or adjusted under 35 U.S.C. 154(b) by 0 days.

(21) Appl. No.: 19/230,601

(22) Filed: Jun. 6, 2025

(51) Int. Cl.
| | | |
|---|---|---|
| G06F 15/16 | (2006.01) | |
| H04L 1/00 | (2006.01) | |
| H04L 67/1042 | (2022.01) | |
| H04L 67/12 | (2022.01) | |

(52) U.S. Cl.
CPC ............ *H04L 67/12* (2013.01); *H04L 1/0001* (2013.01); *H04L 67/1042* (2013.01)

(58) Field of Classification Search
CPC .... H04L 67/12; H04L 1/0001; H04L 67/1042
See application file for complete search history.

(56) References Cited

U.S. PATENT DOCUMENTS

| | | |
|---|---|---|
| 4,392,701 A | 7/1983 | Weidler |
| 4,790,762 A | 12/1988 | Harms et al. |
| 5,941,714 A | 8/1999 | Gorbet et al. |
| 6,162,089 A | 12/2000 | Costello et al. |
| 6,537,109 B1 | 3/2003 | Emery |
| 7,021,974 B2 | 4/2006 | Sichner et al. |
| 7,553,162 B2 | 6/2009 | Isoda et al. |
| 10,020,603 B1 | 7/2018 | Liu et al. |
| 11,330,714 B2 | 5/2022 | Bdeir |
| 2004/0127102 A1 | 7/2004 | Poplawski et al. |
| 2016/0028173 A1 | 1/2016 | Bosscher et al. |
| 2016/0100295 A1* | 4/2016 | Pinard ..................... H04W 4/06 455/518 |
| 2017/0220310 A1 | 8/2017 | Hochman |
| 2020/0262368 A1* | 8/2020 | Lunde ..................... H01R 12/53 |
| 2020/0272135 A1* | 8/2020 | Lake ................. G05B 19/4185 |
| 2020/0328539 A1 | 10/2020 | Lin |
| 2020/0348662 A1* | 11/2020 | Cella ................ G05B 19/41865 |
| 2024/0204434 A1 | 6/2024 | Mann et al. |
| 2024/0304654 A1 | 9/2024 | Bonucci |

* cited by examiner

*Primary Examiner* — Normin Abedin
(74) *Attorney, Agent, or Firm* — Cognition IP, P.C.; Edward Steakley; Saleh Kaihani

(57) ABSTRACT

Devices, such as sensors, can interface with industrial machines and/or the industrial machine computers or sensors, and can extract or obtain machine operation data. Devices can communicate the machine data, via a communication bus, using hardware and software-based communication protocol. Efficiencies can be realized when the devices share the same communication bus and can communicate with one another, by assuming manager or worker status. The devices can include transceivers, having drivers and receivers. In some embodiments, the communication lines can include a talk like and an answer line, connecting all the devices. The devices can selectively connect to the talk line to assume the role of a manager, or connect to the answer line to assume the role of a worker.

19 Claims, 11 Drawing Sheets

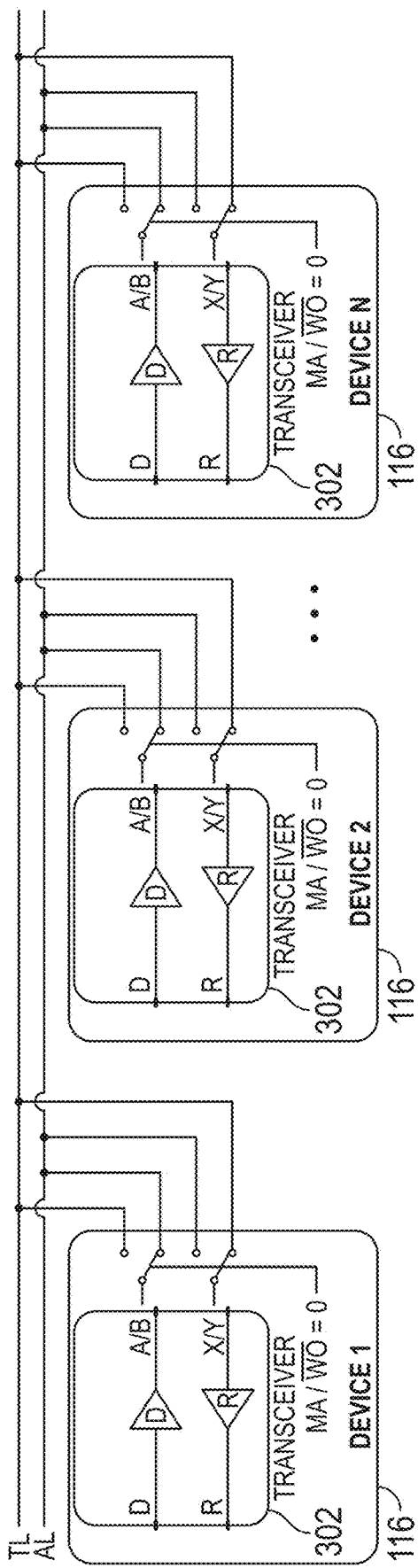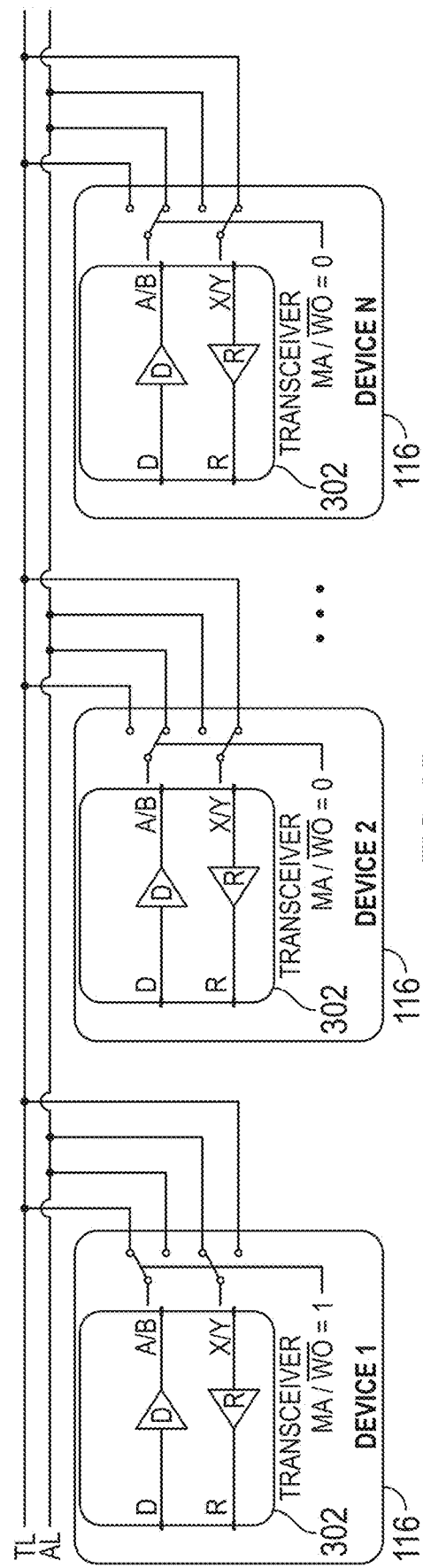

HARDWARE AND SOFTWARE COMMUNICATION PROTOCOL

BACKGROUND

Field

This invention relates generally to the field of communication, and more particularly to communication protocols, using transceiver devices.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Industrial machines can include computer and/or sensor systems that provide monitoring- and maintenance-related machine data. Additionally, various sensors can be attached to or otherwise interfaced with the industrial machines to collect machine operation data. The machine data can be used for monitoring and assessing maintenance issues. Industrial plants can include several, sometimes hundreds, thousands or more machines. Efficiently collecting and transmitting the machine data of the several machines and processing them (for example in a backend infrastructure) can be valuable. Existing approaches to collecting and communicating machine data can require manual human intervention, which can be time consuming and inefficient. As a result, there is a need for more robust hardware and software to collect and communicate machine data in an industrial plant or similar environment.

SUMMARY

The appended claims may serve as a summary of this application. Further areas of applicability of the present disclosure will become apparent from the detailed description, the claims, and the drawings. The detailed description and specific examples are intended for illustration only and are not intended to limit the scope of the disclosure.

BRIEF DESCRIPTION OF THE DRAWINGS

These drawings and the associated description herein are provided to illustrate specific embodiments of the invention and are not intended to be limiting.

FIGS. 3A and 3B illustrate architecture diagrams of the DEC modules and communication lines, where any device can be a manager or a worker.

DETAILED DESCRIPTION

Figure 1:
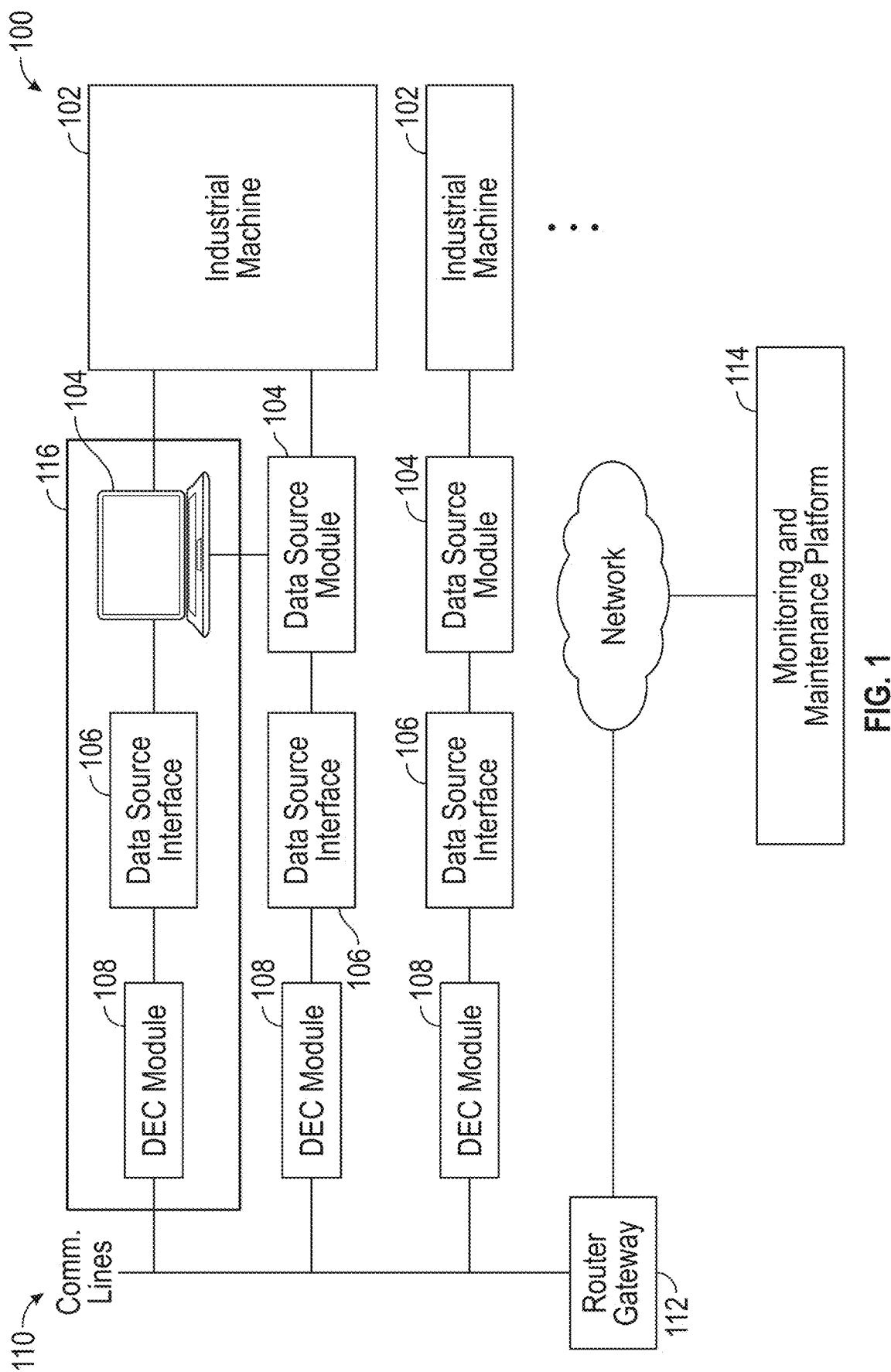
FIG. 1 illustrates a block diagram of an environment of one or more data extraction and communication (DEC) modules, which can collect operational data from one or more industrial machines and transmit the operational data to a monitoring and maintenance platform.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements. Some of the embodiments or their aspects are illustrated in the drawings.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Monitoring and maintenance of an industrial machine can include collecting operational data from the industrial machine, and/or its environment, and processing the operational data with monitoring and maintenance models. Operational data can be collected from a variety of sources, depending on the type of industrial machine and/or its environment. For vibration or environment temperature data one or more external sensors can be placed on the industrial machine or its subcomponents. Some industrial machines on the other hand can include internal components to gather the machine operational data. For example, some industrial machines can include automation computers, which can gather various operational data of the machine, such as voltages, currents, revolutions-per-minutes (RPM), internal temperatures, and many more operational parameters. In some cases, the industrial machines do provide interfaces, via which the operational data can be accessed. However, typically each manufacturer may have its own interface, protocol and systems for communicating the operational data. Existing techniques for collecting operational data can include a technician, walking around a plant with a computer device, such as a tablet, and manually entering the operational data by visually inspecting a display output of the industrial machines and/or the sensors of the machine. Consequently, there is a need for more robust systems and methods for collection of operational data from different industrial machines and communicating the data to a monitoring and maintenance platform (MMP).

FIG. 1 illustrates a block diagram 100 of an environment of one or more data extraction and communication (DEC) modules 108, which can collect operational data from one or more industrial machines 102 and transmit the operational data to a monitoring and maintenance platform (MMP) 114. The industrial machine 102 can be any mechanical, electrical, chemical, or a combination machine in an industrial environment. The environment of the machine 102 can introduce various challenges that can make some data collection and communication technologies less effective. For example, wireless communication in some environments of the machine 102 may be limited or prohibited to prevent unwanted interference. In some industrial environments, various communication technologies might be of less interest, if they can pick up noise and/or fail to reliably capture and/or transmit the operational data produced from the machine 102.

The machine 102 can generate operational data, which can be internally or externally captured by a data source module 104. For example, some machines 102 are part of an automation or robotic implementation of an industrial task, managed by a computer. In this scenario, the computer can be the data source module 104, where it has access to and stores the operational data of the machine 102. Other examples of the data source module 104 can include sensor modules that can store and/or report mechanical (e.g., RPM, pressure, weights, etc.), electrical (e.g., voltages, currents, etc.), chemical (e.g., PH levels, concentrations, etc.) operational parameters of the machine 102. Some data source modules 104 can include audio and/or video recordation devices or generate that type of data as part of their data collection. Each data source module 104 can provide a data source interface 106, via which the collected data can be transferred to another device. As described earlier, each data source interface 106 can utilize its own communication protocols (hardware- and/or software-wise) that may be different from other data source interfaces 106. In other words, in some cases the data source interfaces 106 are not standardized and each manufacturer of the industrial machine 102 and/or the data source module 104 can have their proprietary communication protocol (hardware- and/or software-wise).

In some embodiments, the data source module, the data source interface 106 and the DEC module 108 can be part of a device 116, designed to interface with the machine 102, collect machine data and transmit machine data to the MMP 114. The device 116 can include additional components, not shown, including for example, in some embodiments, a computer, a system on chip, or an independent processing, storage and memory components, similar to a desktop, laptop or tablet computer, but implemented in a form factor and size compatible with the environment of the device 116. For example, in some embodiments, the device 116 can include a printed circuit board (PCB), where components, such as a microprocessor, or a central processing unit (CPU), transitory and non-transitory memory devices (e.g., random-access memory or RAM devices, solid-state, or flash memory devices), busses, input/output (I/O) ports, and communication devices can be mounted. Alternatively, the device 116 can include one or more integrated system on chip (SOC) devices to provide logic and processing functionality to the device 116 and the DEC 108. Other implementations of the device 116 can also be envisioned by the persons of ordinary skill in the art, without departure from the disclosed technology.

The DEC modules 108 can receive the operational data of the machines 102 from their respective data source interfaces 106 and can transmit the operational data via communication lines 110 and a network infrastructure to an MMP 114. For example, the communication lines 110 can be a conduit for transmitting machine data to a communication system (not shown), which can in turn use one or more router/gateway 112, and transmit the machine data through a network to an MMP 114. The MMP 114 can include various artificial intelligence (AI)-based, and/or machine learning (ML)-based models to process the machine data. The MMP 114 can detect anomalies, compare machine data with pre-defined expected operational parameters, and generally provide automation for the monitoring and maintenance of the industrial machines 102.

Various hardware and/or software protocols can be used for transmitting the machine data from each DEC module 108. As described earlier, in some industrial environments wireless communication can be limited, prohibited or unreliable. Furthermore, running separate communication lines 110 for each DEC module 108 can be cumbersome, impractical or prone to breaking or degradation issues. In some embodiments, the DEC modules 108 can be a collected system of interlocking modules, where each DEC module 108 is immediately adjacent to another DEC module 108, and connected through male/female pin structures, or connections (e.g., interlocking pin connecters) eliminating or reducing the need for physical wires, at least between the DEC modules 108. In other words, the communication lines 110, do not necessarily correspond to wires running between the different DEC modules 108. In these and similar implementations, the DEC modules 108 can share the same communication lines 110 or bus, both transmitting machine data and also for receiving data. For example, the DEC modules 108 can receive firmware updates, including operational configuration instructions, such as specifications to be transmitted to and used to configure the data source modules 104. Example firmware instructions can include adjusting sampling frequency, updating the desired sampling ranges and resolutions and/or other specification, relating to the behavior of the data source module 104. Consequently, each DEC module 108 can include both transmitter and receiver circuitry. In some embodiments, the transmitter and receiver circuitry can be implemented with transceivers.

Various architectures and protocols can be considered for connecting the DEC modules 108 to the communication lines 110 and for managing the bi-directional transfer of data to and from the DEC modules 108.

Figure 2A:
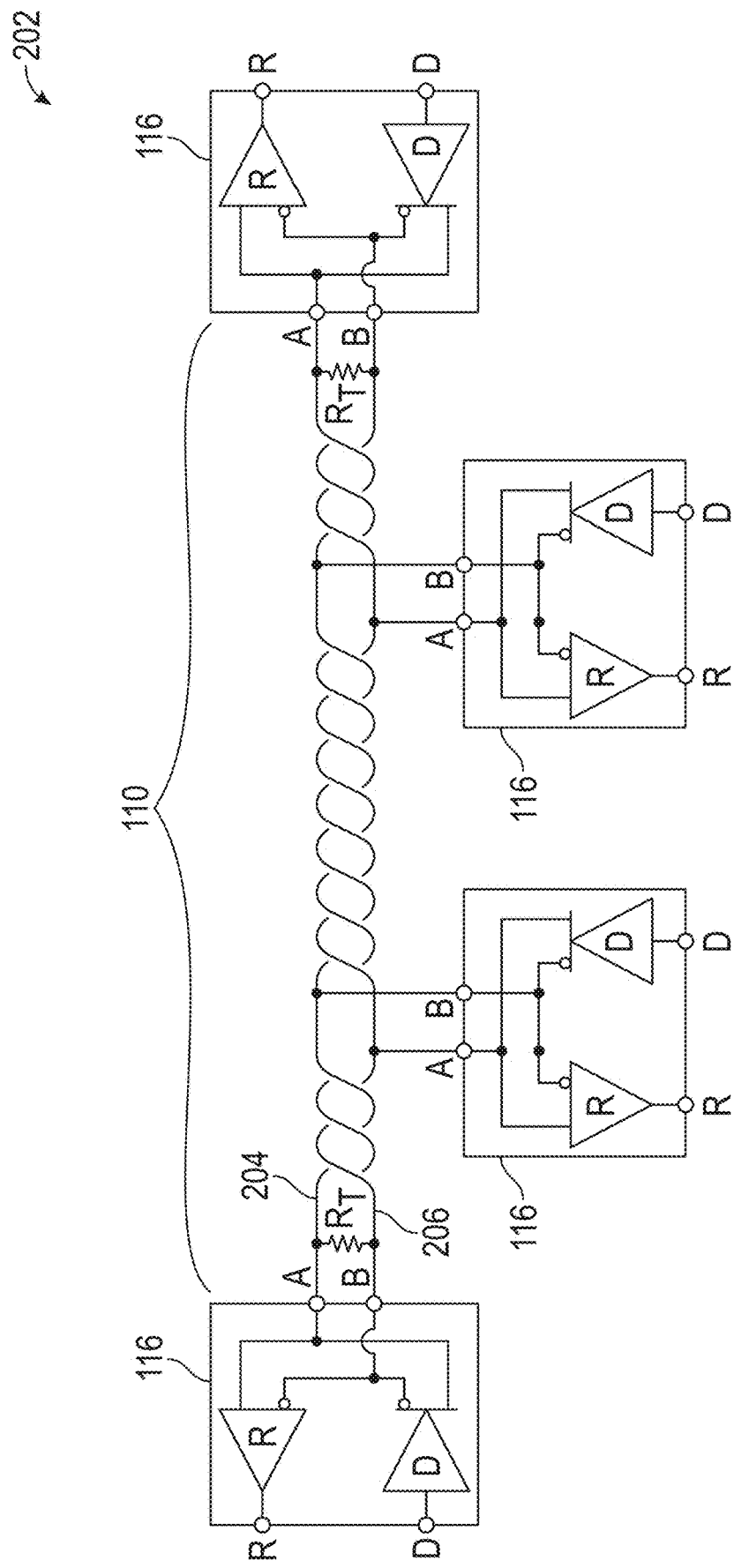
FIG. 2A illustrates an architecture diagram of four devices connected in half-duplex architecture and protocol.

FIG. 2A illustrates an architecture diagram 202 of four devices 116 connected in half-duplex architecture and protocol. In the half-duplex architecture, one communication line 110, comprising of a differential pair of communication lines 204, 206, can be used to connect all receivers (R) and drivers (D). In this context, the drivers (D) transmit data and receivers (R) receive data. The half-duplex architecture can be easy to implement; however, a downside is that the data transmitted by any device can be received by all others. This architecture can allow multiple simultaneous transmission, which can corrupt the signal. Some protocols (e.g., those based on EIA485, such as Modbus RTU and Profibus) may use the figure of a "manager" that can manage the bus (the communication lines 204, 206, so the other devices ("workers") cannot simultaneously attempt to use the communication bus (communication lines 204, 206), without the consent of the manager. Besides this limitation, since there is only one communication line pairs 204, 206, information can only flow in one direction at a time, so devices 116 need to wait for transmission of one device 116 to end, to be able to use the communication lines 204, 206, for transmission or reception. This limitation can reduce or limit the amount of data that can be transported in any interval.

Figure 2B:
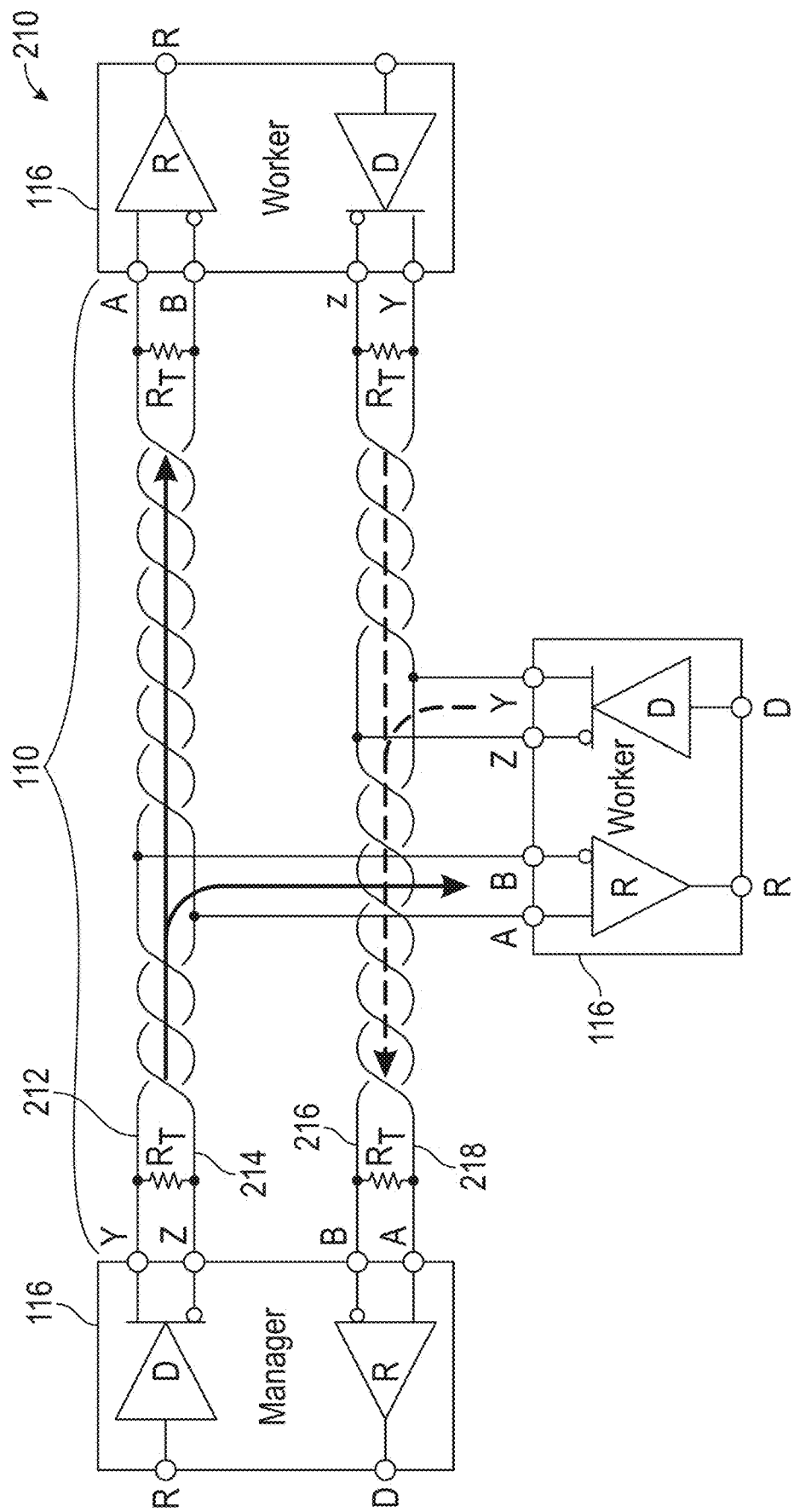
FIG. 2B illustrates an architecture diagram of four devices connected in full-duplex architecture and protocol.

FIG. 2B illustrates an architecture diagram 210 of four devices 116 connected in full-duplex architecture and protocol. In the full duplex architecture, the communication lines 110 includes two pairs of differential communication lines 212, 214 and 216, 218. The two pair communication lines, while in theory can eliminate the transmission rate limitation of the half-duplex architecture, can force a much more defined role for the manager, workers, where the manager and worker devices and the communication lines 110 would have to be hard-wired for their respective roles.

FIGS. 3A and 3B illustrate architecture diagrams of the DEC modules 108 and the communication lines 110, where any device 116 can be a manager or a worker, and each device 116 can transmit and/or receive data from the other devices 116. FIG. 3A relates to the "idle mode," where all devices 116 are workers. FIG. 3B relates to a state, where one device 116 (Device "1" in this example) is connected as the manager. The talk line (TL) is the communication line via which the manager transmits data to the workers, and the answer line (AL) is the line through which the workers can respond to the manager's requests. In other words, the workers can transmit data to the manager, via the answer line (AL). Each device includes a transceiver 302, which can include a driver (D) and a receiver (R). In the "idle mode," illustrated in FIG. 3A, where all devices 116 are workers, all their respective drivers are connected to the answer line (e.g., via a switch), and their respective receivers are connected to the talk line (e.g., via a switch). In FIG. 3B, device "1" is connected as a manager, by having its driver connected to the talk line, and its receiver connected to the answer line. In this manner, the manager (Device "1" in this example) can transmit information to the other devices 116, via the talk line, and can receive information from the other workers, via the answer line. The other devices (Devices "2," and "3" in this example) remain in the worker configuration, where their respective drivers are connected to the answer line, so they can transmit responses and data to the manager, and their respective receivers are connected to the talk line to receive transmission from the manager.

Figure 4A:
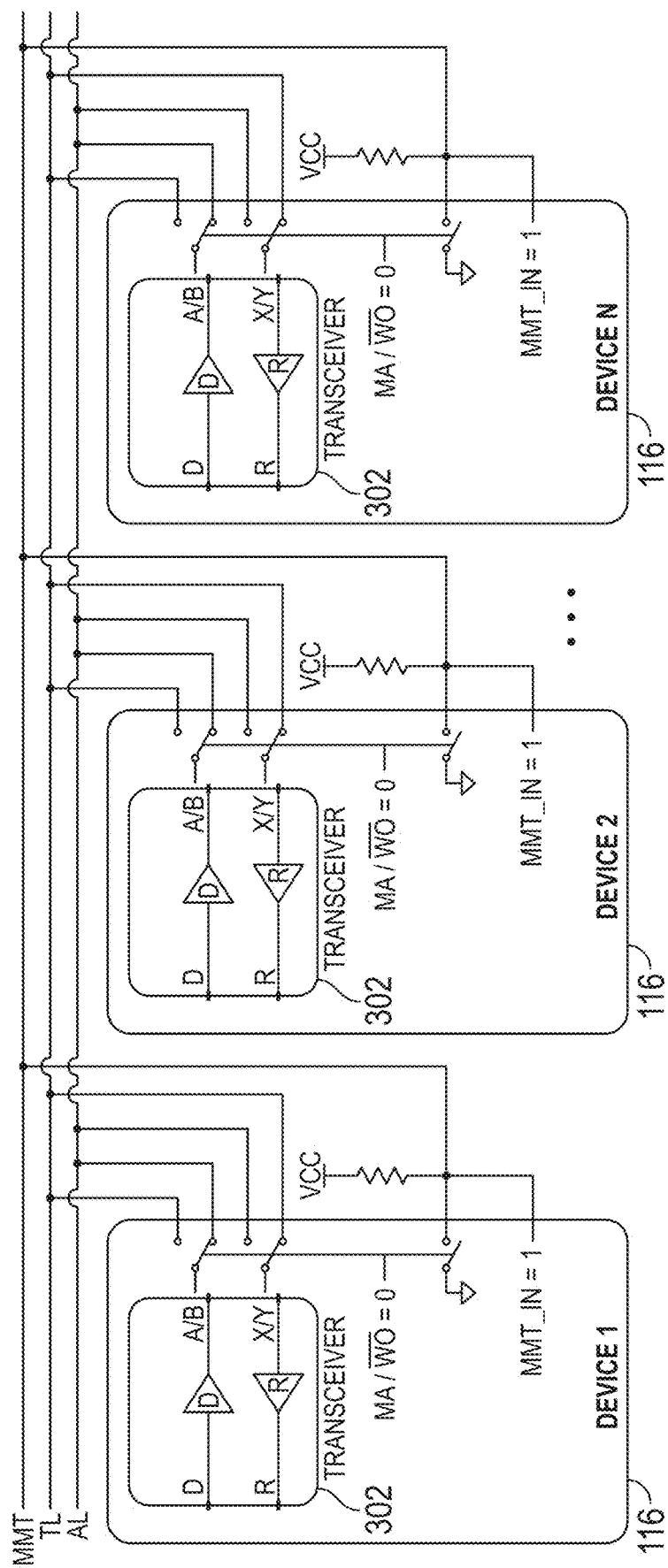
FIG. 4A illustrates an "idle mode" architecture, where all devices are in worker mode.
Figure 4B:
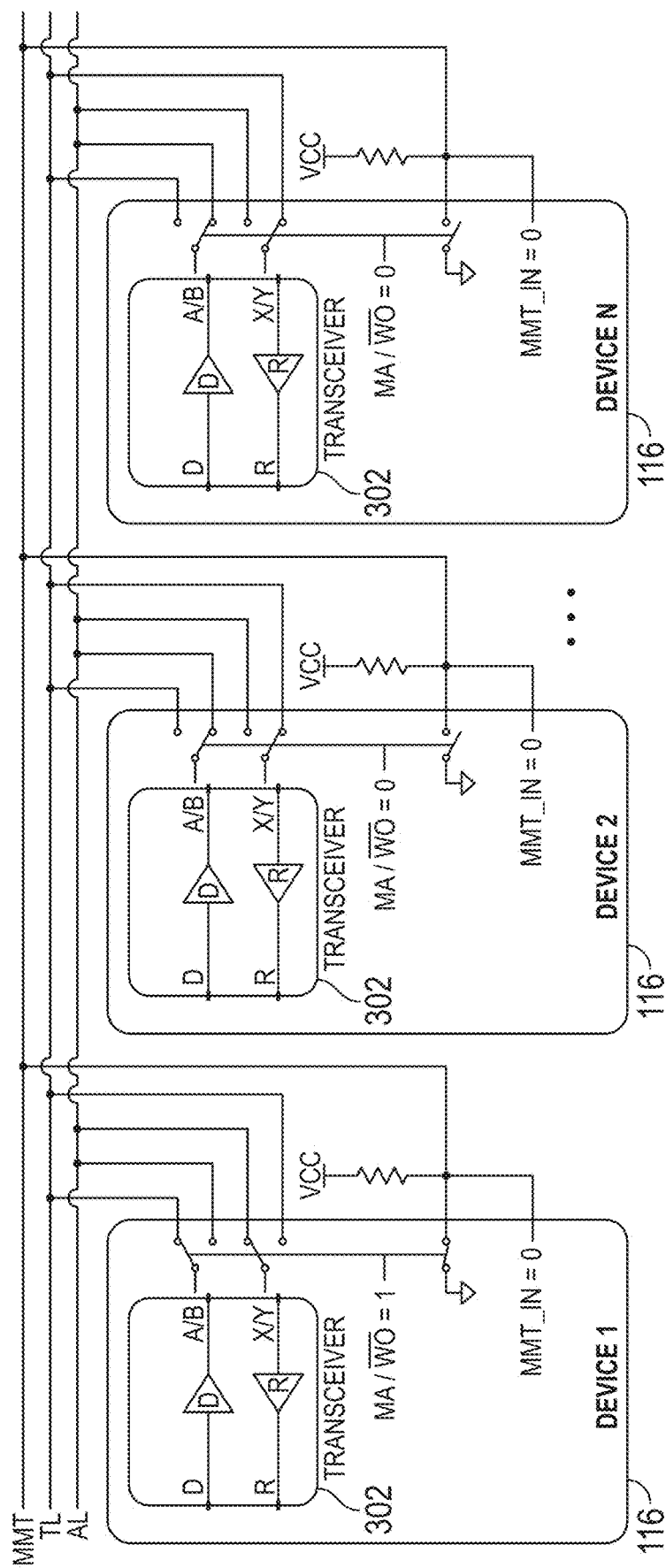
FIG. 4B illustrates an example architecture, where a device has claimed the role of manager.

An improvement to the architecture illustrated in FIGS. 3A, 3B includes a communication line, titled multi-manager token (MMT) line to allow the devices 116 to claim the manager position and to relinquish the manager position. A device 116 can take the manager token by altering the voltage on the MMT line, for example by pulling the voltage down from a logic high state to a logic low state and can subsequently release the manager token by transitioning the voltage on the MMT line from a low logic state to a high logic state. The opposite implementation can also be used, where a low voltage logic state indicates the release of the manager token and a high voltage logic state indicates a taking of the manager token. FIGS. 4A and 4B illustrate example architecture diagrams for the DEC modules 108 and the communication lines 110, where the devices 116 can claim the manager position, or relinquish the manager position, via an MMT line. FIG. 4A illustrates the "idle mode," where all the devices 116 are in worker mode. The configurations of the drivers and receivers are the same as those described in relation to the embodiments of FIGS. 3A, 3B. In the "idle mode," no devices 116 places a voltage on the MMT line. FIG. 4B illustrates an example architecture, where device "1" has claimed the role of manager, by placing a voltage on the MMT line, connecting its driver to the talk line, and connecting its receiver to the answer line. The remaining devices 116 have chosen to assume the role of workers, by not placing a voltage on the MMT line, and keeping their drivers and receivers in the "idle mode," where their drivers are connected to the answer line, and their receivers are connected to the talk line.

The architecture of FIGS. 4A, 4B, can be altered to allow the manager to commandeer both talk line and answer line for transmitting data to the workers or to some workers. This mode can be referred to as the "extended mode," where the rate of data transfer can be doubled. While not shown, two transceivers per device 116 can be used to enable the devices 116 to implement the "extended mode." In "extended mode," one manager device 116 can temporarily use both talk and answer lines to transmit data in the same direction. Compared to the "extended mode," the "standard mode," can occur in the architecture and configuration as illustrated in FIG. 4B, where the manager uses the talk line for transmitting data to the workers, and the workers use the answer line to transmit data to the manager. Consequently, in the "standard mode" of the operation of the devices 116, the flow of the data can be bidirectional, in the talk and answer lines, relative to one another.

Figure 5:
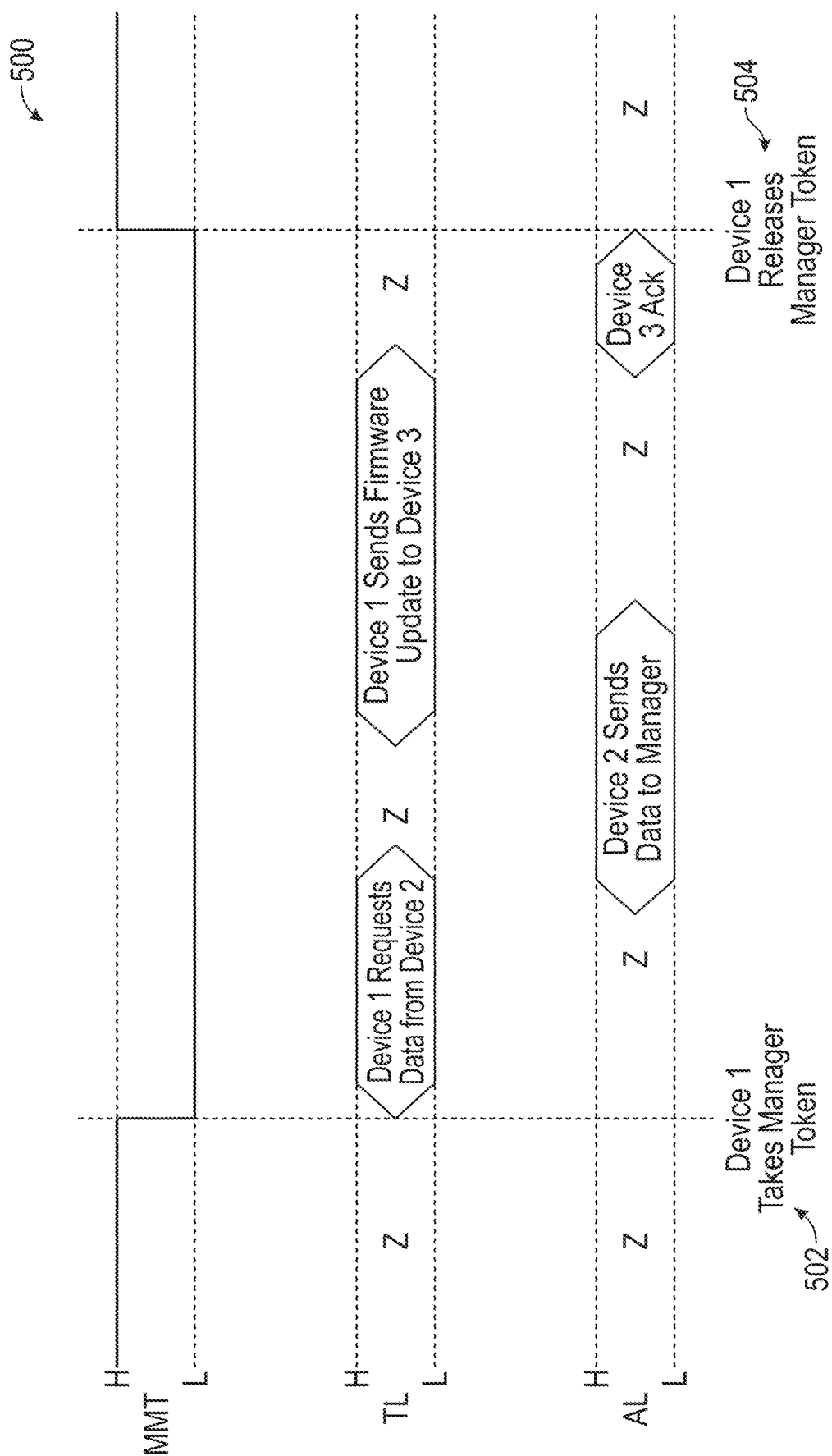
FIG. 5 illustrates a graph of an example signal flow versus time in the "standard mode" of communication protocol between the devices.

FIG. 5 illustrates a graph of an example signal flow 500 versus time in the "standard mode" of communication protocol between the devices 116. The signal flow 500 can occur, for example, in the architecture and configuration illustrated in FIG. 4B. At time 502, Device "1" takes the manager token by pulling the voltage down on MMT line. Device "1" sends a request for data from device "2," and sends firmware update to device "3," on the talk line (TL). Device "2" sends the requested data to device "1" on the answer line (AL). Device "3" sends an acknowledgement message to device "1" on the answer line (AL), acknowledging the receipt of the firmware update. At time 504, device "1" releases the manager token. In the example shown in the signal flow 500, before the time 502, all devices 116 are in "idle mode," where all devices 116 place themselves in worker mode by connecting their receivers to the talk line (TL) and their drivers to the answer line (AL).

Similarly, in the example shown in the signal flow 500, after time 504, all devices place themselves in the "idle mode."

Figure 6:
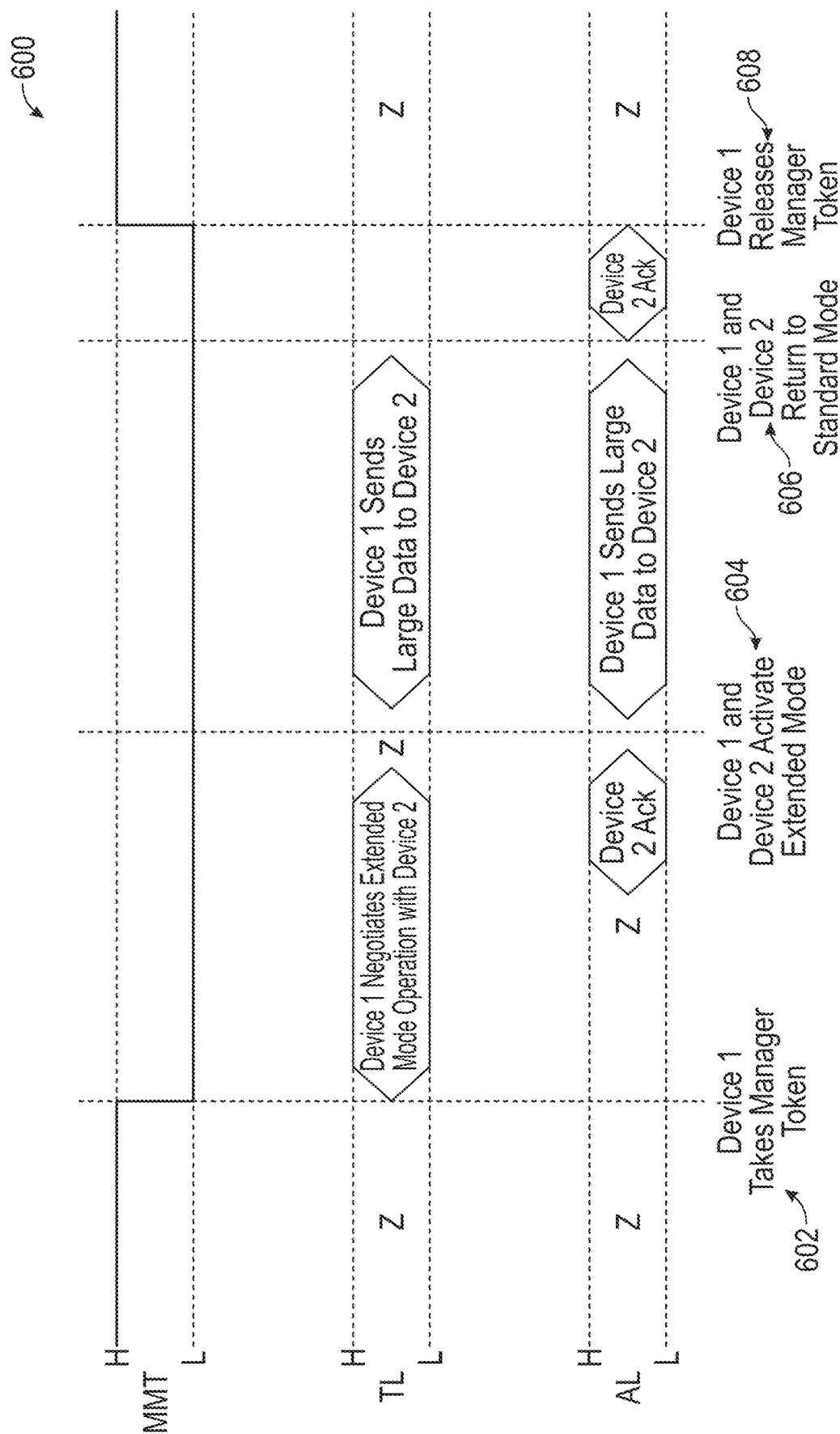
FIG. 6 illustrates a graph of an example signal flow versus time in the "extended mode" operation of the communication protocol between the devices.

FIG. 6 illustrates a graph of an example signal flow 600 versus time in the "extended mode" operation. In the example shown, before time 602, all devices 116 are in "idle model." At time 602, device "1" takes the manager token, by pulling the voltage down on the MML line. Device "1" sends one or more messages on talk line (TL) to device "2" negotiating "extended mode" operation with device "2." Device "2" sends an affirmative acknowledgement message to Device "1," on the answer line (AL). At time 604, devices "1" and "2" activate the "extended mode," which can include device "1" activating two drivers, one driver on the talk line (TL) and one driver on the answer line (AL). "Extended mode" in this scenario can include device "2" activating two receivers, one receiver on talk line (TL) and one receiver on the answer line (AL). Subsequently, device "1" can transmit data to device "2," using both talk line (TL) and answer line (AL). At time 606, device "1" and "2" return to standard mode, where device "1" is the manager and device "2" is the worker. In the "standard mode," device "1" activates a driver on the talk line (TL) and a receiver on the answer line (AL). Device "2" sends an acknowledgment message confirming "standard mode" on to device "1" on the answer line (AL). At time 608, device "1" releases the manager token by restoring the high voltage on the MMT line. In this example, after time 608, devices 116 return to the "idle mode," by placing themselves in the worker mode.

A manager device can manage the communication lines 110. For example, if the manager is receiving answers from multiple workers on the answer line, it can manage the timing of which worker utilizes the answer line (AL) for providing data by transmitting management messages on the talk line (TL). The management messages can include instructions for selected workers, whereby the workers identified in the instructions can implement the instructions and the workers not mentioned in the instructions can ignore the management message.

Figure 7:
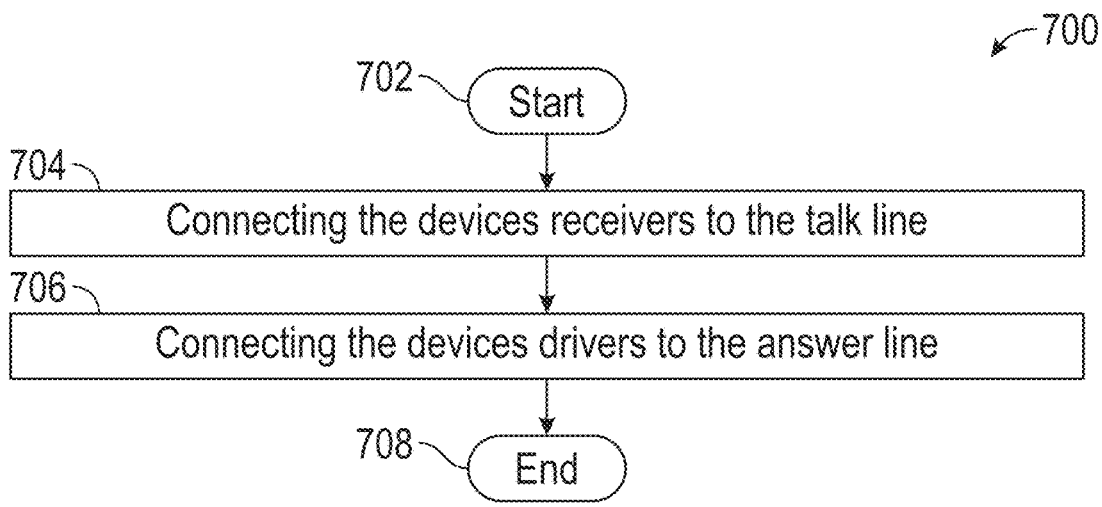
FIG. 7 illustrates a flowchart of an example method of the "idle mode" operation in the described hardware and software protocol.

FIG. 7 illustrates a flowchart of an example method 700 of the "idle mode" operation in the described hardware and software protocol. The method starts at step 702. Step 704 includes connecting the receivers of the devices to the talk line. Step 706 includes connecting the drivers of the devices to the answer line. Steps 704, 706 places all devices in worker mode, so if any device claims the manager role, the remaining devices are ready for communicating with the manager. The method ends at step 708.

Figure 8:
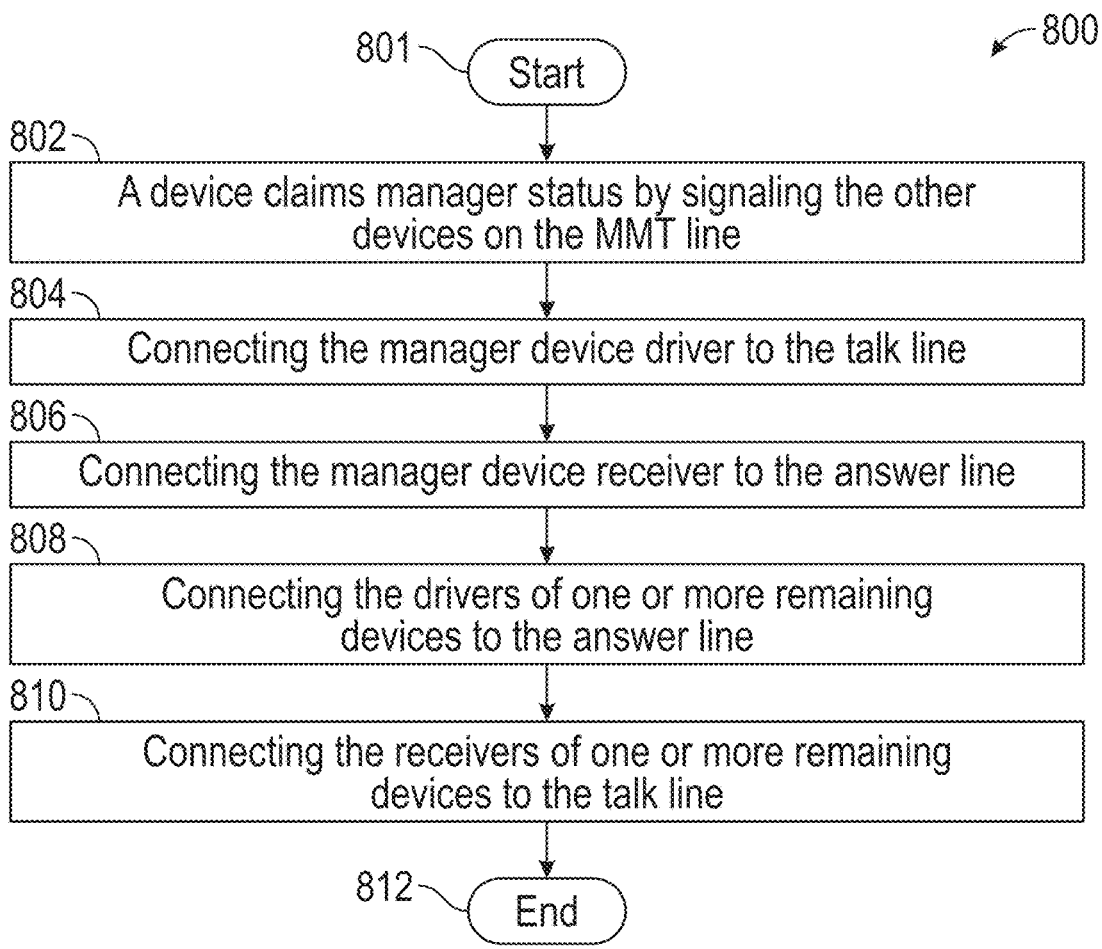
FIG. 8 illustrates a flowchart of an example method of the "standard mode" operation in the described hardware and software protocol.

FIG. 8 illustrates a flowchart of an example method 800 of the "standard mode" operation in the described hardware and software protocol. The method starts at step 801. Step 802 includes a device claiming the manager role, by signaling the other devices on the MMT line. Signaling can include causing a logic voltage change on the MMT line by the device claiming manager status. Step 802 can be referred to as a device taking the manager token. Step 804 includes connecting the driver of the manager device to the talk line. Step 806 includes connecting the receiver of the manager device to the answer line. Step 808 includes connecting the drivers of one or more remaining devices to the answer line. Step 810 includes connecting the receivers of one or more remaining devices to the talk line. The method ends at step 812.

Figure 9:
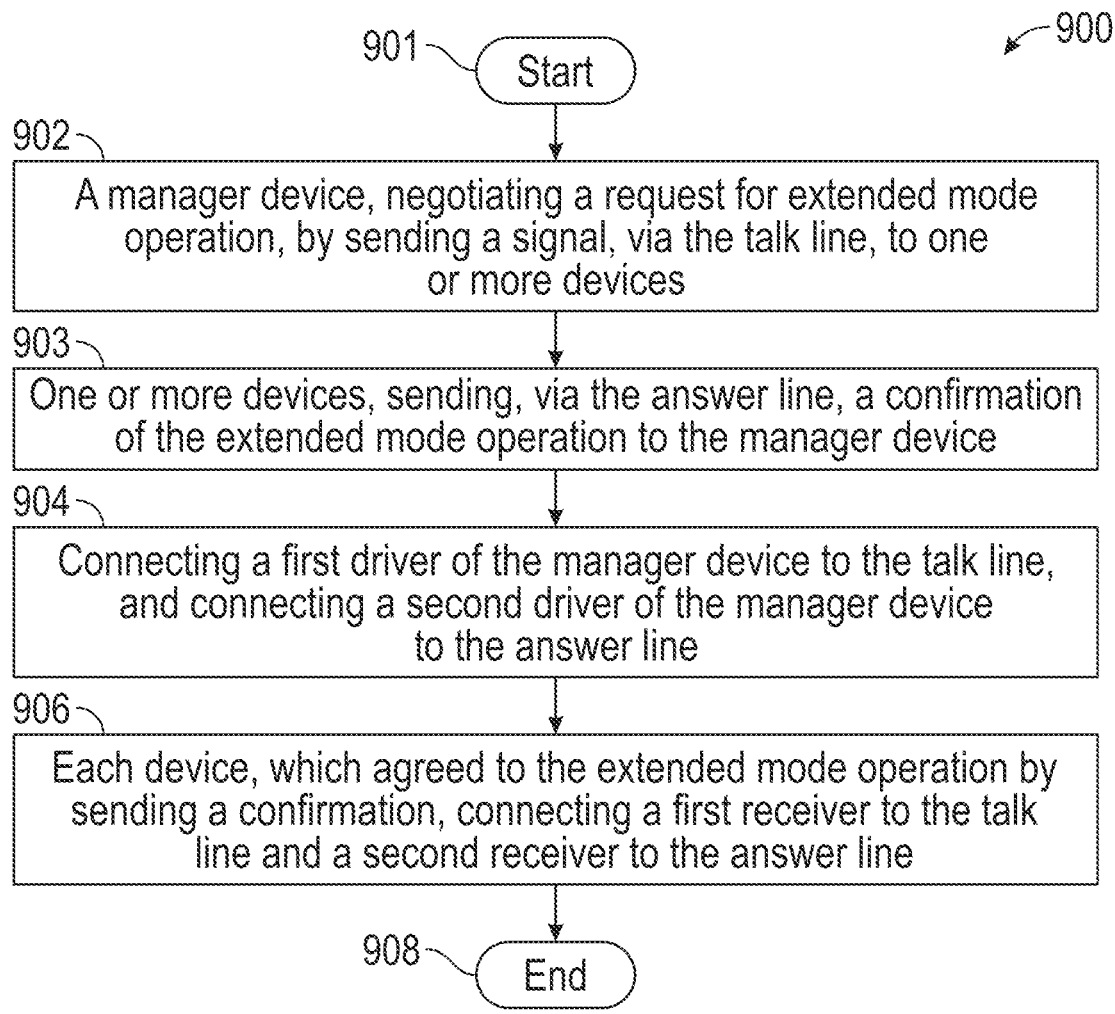
FIG. 9 illustrates a flowchart of an example method of the "extended mode" operation in the described hardware and software protocol.

FIG. 9 illustrates a flowchart of an example method 900 of the "extended mode" operation in the described hardware and software protocol. The method starts at step 901. Step 902 includes a manager device, negotiating a request for "extended mode" operation, by sending, via the talk line a signal to one or more devices. Step 903 can include one or more devices sending, via the answer line, a confirmation of the "extended mode" operation to the manager device. Step 904 includes connecting a first driver of the manager device to the talk like and connecting a second driver of the manager device to the answer line. Step 906 includes each device, which agreed to the "extended mode" operation by sending a confirmation, connecting a first receiver to the talk line, and a second receiver to the answer line. The method ends at step 908.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
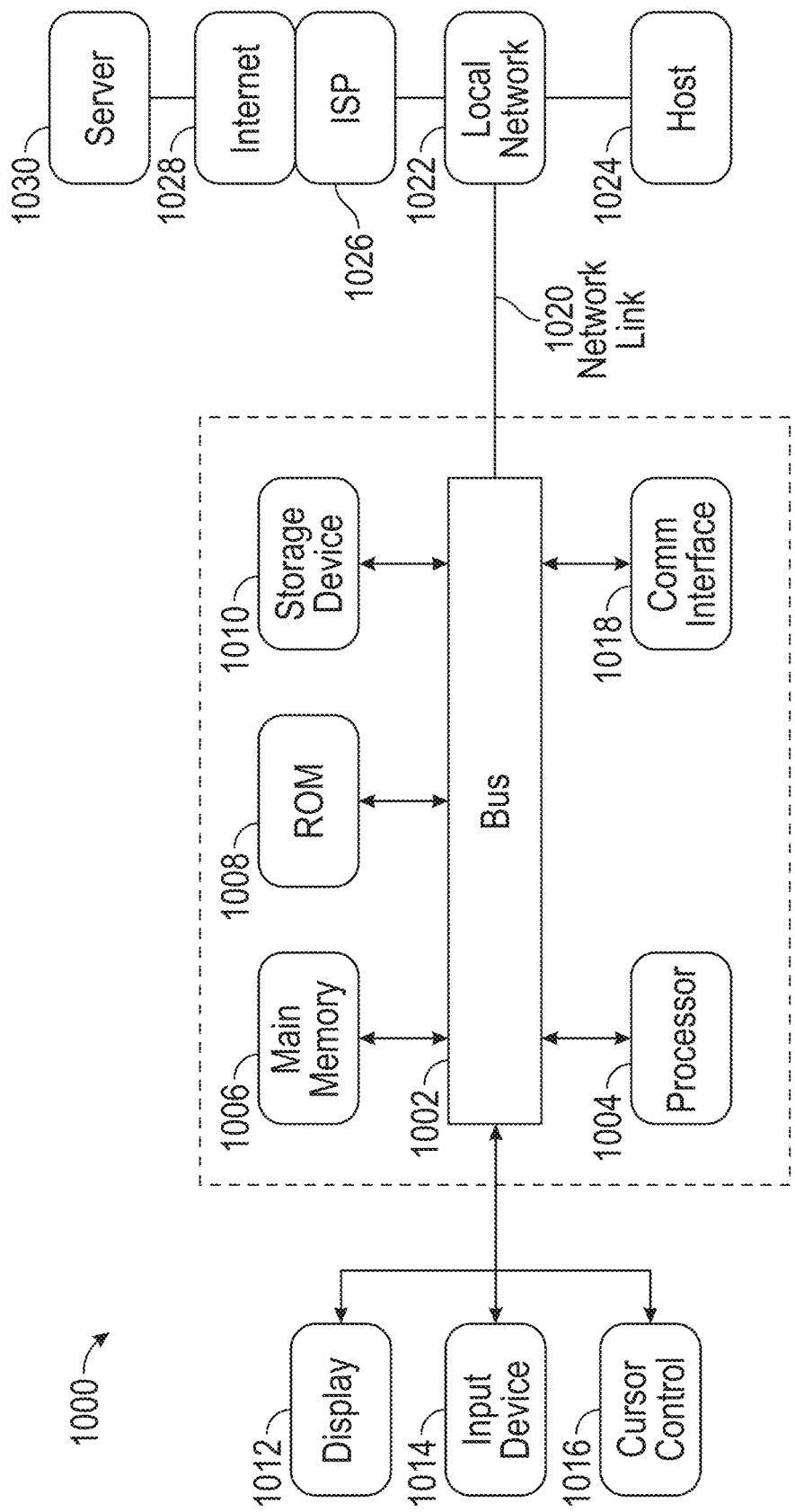
FIG. 10 illustrates an environment in which some embodiments may operate.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A system comprising: a plurality of devices, configured to interface with one or more machines and obtain machine data; communication lines, comprising at least a talk line and an answer line; and the devices further comprising a communication module each, the communication module comprising at least one transceiver, having a driver and a receiver, the driver and the receiver selectively and independently connectable to the talk line and/or the answer line, wherein the drivers are configured to transmit data and receivers are configured receive data; wherein the devices are configured to communicate via a hardware and software protocol, wherein the protocol comprises a standard mode, wherein in the standard mode, a manager device is configured to connect the driver of the manager device to the talk line, and the receiver of the manager device to the answer line, and one or more remaining devices are configured to connect the drivers of the one or more remaining devices to the answer line and the receivers of the one or more remaining devices to the talk line.

Example 2: The system of Example 1, further comprising a maintenance and monitoring platform, wherein the communication lines are coupled to the maintenance and monitoring platform and configured to transmit the machine data of the one or more machines to the maintenance and monitoring platform.

Example 3: The system of any of Examples 1 and 2, wherein the communication lines further comprise a multi-manager token line, wherein a device is configured to signal a selection of a manager status for the device by causing a voltage change on the multi-manager token line.

Example 4: The system of any of Examples 1-3, wherein the protocol further comprises an idle mode, wherein in the idle mode, the devices are configured to connect the receivers of the devices to the talk line and the drivers of the devices to the answer line.

Example 5: The system of any of Examples 1-4, wherein in the standard mode, the manager device is configured to manage the answer line by signaling to the remaining devices, via the talk line, an order or priority of sending data by the remaining devices to the manager device via the answer line.

Example 6: The system of any of Examples 1-5, wherein each of the talk line and answer line comprise a pair of differential connections.

Example 7: The system of any of Examples 1-6, wherein in the standard mode, the manager device is configured to send, via the talk line, a request for machine data to a first device and firmware update to a second device, wherein the first device, sends, via the answer line, the requested machine data to the manager device.

Example 8: The system of any of Examples 1-7, wherein the protocol further comprises an extended mode, wherein in the extended mode, the manager device is configured to connect a first driver of the manager device to the talk line, and a second driver of the manager device to the answer line; and a second device, is configured to connect a first receiver of the second device to the talk line and a second receiver of the second device to the answer line.

Example 9: The system of any of Examples 1-8, wherein the plurality of the devices are interlocking via male/female connectors.

Example 10: The system of any of Examples 1-9, further comprising a communication system configured to transmit the machine data to a maintenance and monitoring platform, wherein the platform comprises one or more artificial intelligence-based models, configured to provide monitoring and maintenance of the one or more machines.

Example 11: A method comprising: providing a plurality of devices, interfacing the devices with one or more machines obtaining machine data by the devices; providing communication lines, comprising at least a talk line and an answer line; wherein the devices further comprise a communication module each, the communication module comprising at least one transceiver, having a driver and a receiver, the driver and the receiver selectively and independently connectable to the talk line and/or the answer line, configuring the drivers to transmit data and the receivers to receive data; the devices communicating via a hardware and software protocol, wherein the protocol comprises a standard mode, wherein in the standard mode, the method further comprises: a manager device, connecting a driver of the manager device to the talk line, and a receiver of the manager device to the answer line, and one or more remaining devices connecting the drivers of the one or more remaining devices to the answer line and the receivers of the one or more remaining devices to the talk line.

Example 12: The method of Example 11, further comprising: providing a maintenance and monitoring platform, wherein the communication lines are coupled to the maintenance and monitoring platform, and transmitting the machine data of the one or more machines to the maintenance and monitoring platform.

Example 13: The method of any of Examples 11 and 12, wherein the communication lines further comprise a multi-manager token line, and the method further comprises a device signaling a selection of a manager status for the device by effecting a voltage change on the multi-manager token line.

Example 14: The method of any of Examples 11-13, wherein the protocol further comprises an idle mode, wherein in the idle mode, the method further comprises: the devices connecting the receivers of the devices to the talk line and the drivers of the devices to the answer line.

Example 15: The method of any of Examples 11-14, wherein in the standard mode, the method further comprises: the manager device managing the answer line by signaling to the remaining devices, via the talk line, an order or priority of sending data by the remaining devices to the manager device via the answer line.

Example 16: The method of any of Examples 11-15, wherein each of the talk line and answer line comprise a pair of differential connections.

Example 17: The method of any of Examples 11-16, wherein in the standard mode, the method further comprises: the manager device sending, via the talk line, a request for machine data to a first device and firmware update to a second device; and the first device, sending, via the answer line, the requested machine data to the manager device.

Example 18: The method of any of Examples 11-17, wherein the protocol further comprises an extended mode, wherein in the extended mode, the method further comprises: the manager device connecting a first driver of the manager device to the talk line, and a second driver of the manager device to the answer line; and a second device connecting a first receiver of the second device to the talk line and a second receiver of the second device to the answer line.

Example 19: The method of any of Examples 11-18, further comprising connecting the plurality of the devices, with interlocking male/female connectors.

Example 20: The method of any of Examples 11-19, further comprising: transmitting the machine data to a maintenance and monitoring platform; and performing monitoring and maintenance operations, based on output of one or more artificial intelligence-based models.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including, hard drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects.

What is claimed is:

1. A system comprising:
a plurality of devices, configured to interface with one or more machines and obtain machine data;
communication lines, comprising at least a talk line and an answer line and comprising a multi-manager token line, wherein the plurality of devices is configured to signal a selection of a manager status for a respective device by causing a voltage change on the multi-manager token line; and
the devices further comprising a communication module each, the communication module comprising at least one transceiver, having a driver and a receiver, the driver and the receiver selectively and independently connectable to the talk line and/or the answer line, wherein the drivers are configured to transmit data and receivers are configured receive data;
wherein the devices are configured to communicate via a hardware and software protocol, wherein the protocol comprises a standard mode,
wherein in the standard mode,
a manager device is configured to connect the driver of the manager device to the talk line, and the receiver of the manager device to the answer line, and
one or more remaining devices are configured to connect the drivers of the one or more remaining devices to the answer line and the receivers of the one or more remaining devices to the talk line.

2. The system of claim 1, further comprising a maintenance and monitoring platform, wherein the communication lines are coupled to the maintenance and monitoring platform and configured to transmit the machine data of the one or more machines to the maintenance and monitoring platform.

3. The system of claim 1, wherein the protocol further comprises an idle mode, wherein in the idle mode, the devices are configured to connect the receivers of the devices to the talk line and the drivers of the devices to the answer line.

4. The system of claim 1, wherein in the standard mode, the manager device is configured to manage the answer line by signaling to the remaining devices, via the talk line, an order or priority of sending data by the remaining devices to the manager device via the answer line.

5. The system of claim 1, wherein each of the talk line and answer line comprise a pair of differential connections.

6. The system of claim 1, wherein in the standard mode, the manager device is configured to send, via the talk line, a request for machine data to a first device and firmware update to a second device, wherein the first device, sends, via the answer line, the requested machine data to the manager device.

7. The system of claim 1, wherein the protocol further comprises an extended mode, wherein in the extended mode,
the manager device is configured to connect a first driver of the manager device to the talk line, and a second driver of the manager device to the answer line; and
a second device, is configured to connect a first receiver of the second device to the talk line and a second receiver of the second device to the answer line.

8. The system of claim 1, further comprising a communication system configured to transmit the machine data to a maintenance and monitoring platform, wherein the platform comprises one or more artificial intelligence-based models, configured to provide monitoring and maintenance of the one or more machines.

9. A method comprising:
providing a plurality of devices, interfacing the devices with one or more machines obtaining machine data by the devices;
providing communication lines, comprising at least a talk line and an answer line and comprising a multi-manager token line, wherein the plurality of devices is configured to signal a selection of a manager status for a respective device by causing a voltage change on the multi-manager token line;
wherein the devices further comprise a communication module each, the communication module comprising at least one transceiver, having a driver and a receiver, the driver and the receiver selectively and independently connectable to the talk line and/or the answer line, configuring the drivers to transmit data and the receivers to receive data;

the devices communicating via a hardware and software protocol, wherein the protocol comprises a standard mode, wherein in the standard mode, the method further comprises:
- a manager device, connecting a driver of the manager device to the talk line, and a receiver of the manager device to the answer line, and
- one or more remaining devices connecting the drivers of the one or more remaining devices to the answer line and the receivers of the one or more remaining devices to the talk line.

10. The method of claim 9, further comprising:
providing a maintenance and monitoring platform, wherein the communication lines are coupled to the maintenance and monitoring platform, and
transmitting the machine data of the one or more machines to the maintenance and monitoring platform.

11. The method of claim 9, wherein the protocol further comprises an idle mode, wherein in the idle mode, the method further comprises: the devices connecting the receivers of the devices to the talk line and the drivers of the devices to the answer line.

12. The method of claim 9, wherein in the standard mode, the method further comprises: the manager device managing the answer line by signaling to the remaining devices, via the talk line, an order or priority of sending data by the remaining devices to the manager device via the answer line.

13. The method of claim 9, wherein each of the talk line and answer line comprise a pair of differential connections.

14. The method of claim 9, wherein in the standard mode, the method further comprises:
the manager device sending, via the talk line, a request for machine data to a first device and firmware update to a second device; and
the first device, sending, via the answer line, the requested machine data to the manager device.

15. The method of claim 9, wherein the protocol further comprises an extended mode, wherein in the extended mode, the method further comprises:
the manager device connecting a first driver of the manager device to the talk line, and a second driver of the manager device to the answer line; and
a second device connecting a first receiver of the second device to the talk line and a second receiver of the second device to the answer line.

16. The method of claim 9, further comprising:
transmitting the machine data to a maintenance and monitoring platform; and
performing monitoring and maintenance operations, based on output of one or more artificial intelligence-based models.

17. A system comprising:
a plurality of devices, configured to interface with one or more machines and obtain machine data;
communication lines, comprising at least a talk line and an answer line; and
the devices further comprising a communication module each, the communication module comprising at least one transceiver, having a driver and a receiver, the driver and the receiver selectively and independently connectable to the talk line and/or the answer line, wherein the drivers are configured to transmit data and receivers are configured receive data;
wherein the devices are configured to communicate via a hardware and software protocol, wherein the protocol comprises a standard mode,
wherein in the standard mode,
a manager device is configured to connect the driver of the manager device to the talk line, and the receiver of the manager device to the answer line, and
one or more remaining devices are configured to connect the drivers of the one or more remaining devices to the answer line and the receivers of the one or more remaining devices to the talk line; and
wherein in the standard mode,
the manager device is configured to send, via the talk line, a request for machine data to a first device and firmware update to a second device, wherein the first device, sends, via the answer line, the requested machine data to the manager device.

18. The system of claim 17, wherein the protocol further comprises an extended mode, wherein in the extended mode,
the manager device is configured to connect a first driver of the manager device to the talk line, and a second driver of the manager device to the answer line; and
a second device, is configured to connect a first receiver of the second device to the talk line and a second receiver of the second device to the answer line.

19. A system comprising:
a plurality of devices, configured to interface with one or more machines and obtain machine data;
communication lines, comprising at least a talk line and an answer line; and
the devices further comprising a communication module each, the communication module comprising at least one transceiver, having a driver and a receiver, the driver and the receiver selectively and independently connectable to the talk line and/or the answer line, wherein the drivers are configured to transmit data and receivers are configured receive data;
wherein the devices are configured to communicate via a hardware and software protocol, wherein the protocol comprises a standard mode,
wherein in the standard mode,
a manager device is configured to connect the driver of the manager device to the talk line, and the receiver of the manager device to the answer line, and
one or more remaining devices are configured to connect the drivers of the one or more remaining devices to the answer line and the receivers of the one or more remaining devices to the talk line; and
wherein the protocol further comprises an extended mode, wherein in the extended mode,
the manager device is configured to connect a first driver of the manager device to the talk line, and a second driver of the manager device to the answer line; and
a second device, is configured to connect a first receiver of the second device to the talk line and a second receiver of the second device to the answer line.

* * * * *